United States Patent [19]

Kopich

[11] Patent Number: 4,685,531

[45] Date of Patent: Aug. 11, 1987

[54] MOTOR VEHICLE POWER TRAIN TORQUE STRUT

[75] Inventor: Leonard F. Kopich, Madison Heights, Mich.

[73] Assignee: General Motors Corporation, Detroit, Mich.

[21] Appl. No.: 846,557

[22] Filed: Mar. 31, 1986

[51] Int. Cl.[4] .............................. B60K 5/04
[52] U.S. Cl. .................... 180/300; 248/550; 248/609; 267/292
[58] Field of Search ............. 180/299, 300; 248/550, 248/608, 609, 638; 267/63 R, 63 A, 153

[56] References Cited

U.S. PATENT DOCUMENTS

| | | | |
|---|---|---|---|
| 4,240,517 | 12/1980 | Harlow, Jr. et al. | 180/300 X |
| 4,610,420 | 9/1986 | Fukushima et al. | 180/300 X |
| 4,616,846 | 10/1986 | Furuya et al. | 267/140.1 X |

FOREIGN PATENT DOCUMENTS 191129  11/1982  Japan ...................... 180/300

OTHER PUBLICATIONS

0176934 European Patent Application, Calcagho, 4/1986.

Primary Examiner—John J. Love
Assistant Examiner—Michael Mar
Attorney, Agent, or Firm—R. L. Phillips

[57] ABSTRACT

A torque strut is pivotally connected about pivot axes at opposite ends thereof between a vehicle and its power train for controlling the pitching of the latter. The torque strut has an elastomeric bushing that is supported for angular movement about one of its pivot axes and has a configuration such as to effect a spring rate acting longitudinally of the strut that varies with angular movement of the bushing. The strut additionally has a drive for automatically angularly moving the bushing to vary the spring rate in response to varying power train operating conditions.

2 Claims, 5 Drawing Figures

MOTOR VEHICLE POWER TRAIN TORQUE STRUT

TECHNICAL FIELD

This invention relates to motor vehicle power train torque struts and more particularly to the spring rate therein.

BACKGROUND OF THE INVENTION

Where an engine and transmission are mounted transversely with a differential as a power train in a motor vehicle to drive either the front or rear wheels, it is common practice to employ a torque strut between the engine and the vehicle chassis to control pitching of the power train. Normally, elastomeric bushings are used at the pivot connections of the torque strut that are configured so as to provide a soft substantially linear spring rate at small vibratory pitching amplitudes occurring with low torque. In addition, the bushings may be configured so that for large pitching power train amplitudes occurring at high torque, the strut mounts then additionally provide non-linear rates that increase with increasing large pitching amplitudes so as to best isolate such pitching vibrations of the power train. An example of such a torque strut arrangement is disclosed in U.S. Pat. No. 4,240,517 assigned to the assignee of this invention. In such prior art struts, the spring rates are built in or fixed and are a compromise found to be best suited to the full range of pitching motions to be encountered. And thus such struts are not ideally suited to controlling all the power train pitching motions as the engine speed and torque vary through wide ranges.

SUMMARY OF THE PRESENT INVENTION

The present invention is directed to providing optimum power train pitch control at all engine and torque conditions with a simple and compact arrangement. According to the present invention and rather than providing a torque strut with elastomeric bushings configured to provide a compromising spring rate, there is provided a variable spring rate torque strut having an elastomeric bushing that is supported on the strut between the power train and vehicle chassis for angular movement about one of the pivot axes by which the strut is connected therebetween. The bushing is formed with a configuration such as to effect a spring rate acting longitudinally of the strut that varies with angular movement of the bushing. And a drive means is incorporated into the strut for automatically angularly moving such bushing to vary its active spring rate in accordance with varying engine conditions such as engine speed and torque to provide the desired pitch control at all the varying conditions.

DESCRIPTION OF THE PREFERRED EMBODIMENT

These and other objects, advantages and features of the present invention will become more apparent from the following description and drawings in which.

Figure 1:
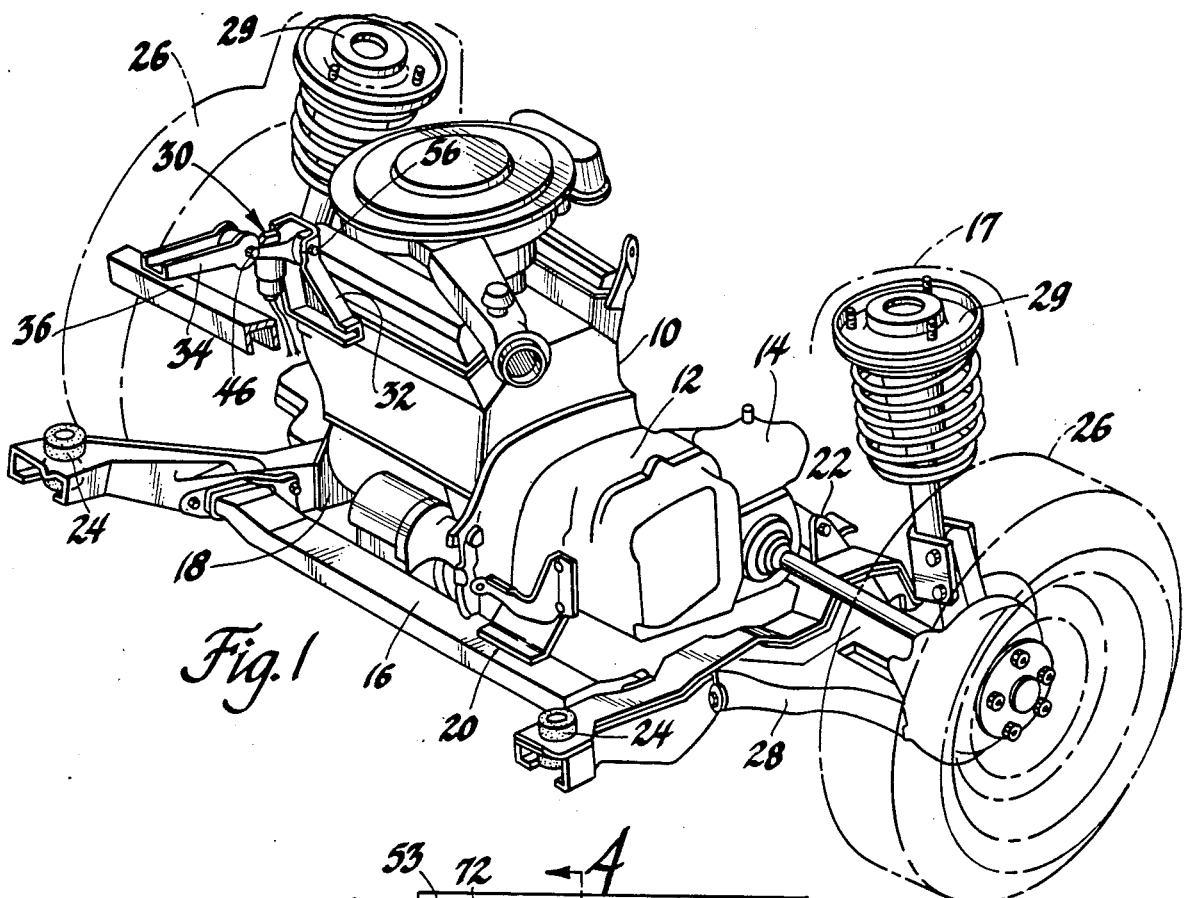
FIG. 1 is a perspective view of a front-wheel-drive motor vehicle of compact size in which is employed the preferred embodiment of the variable spring rate torque strut of the present invention.

Referring to the drawings wherein the same numerals are used throughout the several views to identify the same parts, there is shown in FIG. 1 a front-wheel-drive motor vehicle power train comprising an engine 10 and transmission 12 that are mounted transversely together with a differential 14 on a cradle 16 in the front of a compact size motor vehicle of which only a partial outline of the vehicle's unitized body 17 is shown. The power train is cushion mounted on the cradle by three engine mounts 18, 20 and 22 and the cradle is in turn cushion mounted on the vehicle body by four identical cradle mounts 24. The power train is connected to drive the vehicle's front wheels 26 that are idependently supported on the chassis by a lower control arm 28 attached to the cradle and by a MacPherson strut 29 attached to the vehicle body. In addition, a torque strut 30 is pivotally connected at one end to a bracket 32 on the engine and at the other end to a bracket 34 welded to a laterally extending vehicle body cross frame member 36. The power train arrangement and the support therefor thus far described including the arrangement of the torque strut 30, but not the details thereof, is like that disclosed in the afore-mentioned U.S. Pat. No. 4,240,517 which is hereby incorporated by reference and to which reference is directed for further details apart from those of the torque strut now described.

According to the present invention, the torque strut 30 in its preferred form as shown in FIGS. 2-5 comprises an oblong metal body 38 having circular eyes 40 and 42 of relatively small and large diameter respectively formed in the opposite ends thereof. In the small diameter eye 40, there is bonded a cylindrically-shaped elastomeric bushing 44 that is also bonded to a centrally located metal bushing 45 located centrally therein. The latter bushing receives a bolt 46 that pivotally secures this end of the strut to the bracket 34 on the vehicle body. On the other hand, there is rotatably mounted in the other torque strut eye 42, a larger diameter elastomeric bushing 50 that is bonded to a metal bushing 52 located centrally therein. In this case, the metal bushing 52 is axially longer than the elastomeric bushing and receives a sleeve 54 that is even slightly longer. The sleeve 54 engages at its opposite ends with sides 53 of the bracket 32 on the engine and receives a bolt 56 by which the strut is pivotally connected at this end to this bracket.

Figure 3:
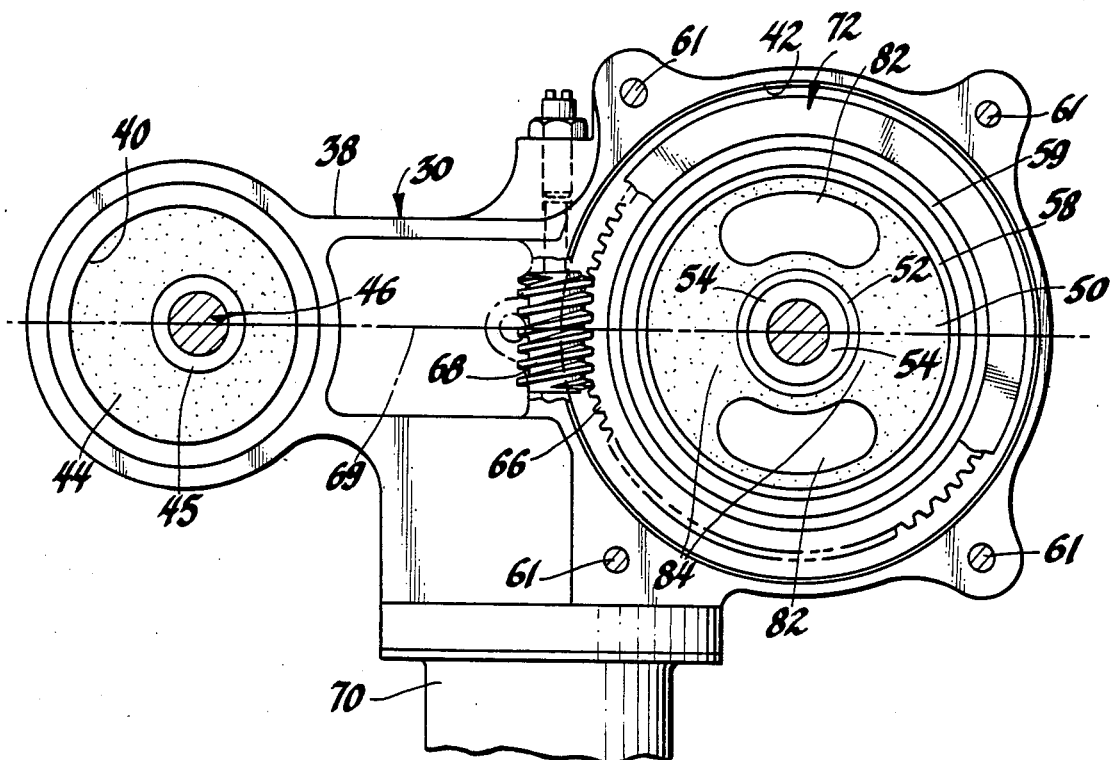
FIG. 3 is a fragmentary view from FIG. 2 with further parts broken away.
Figure 5:
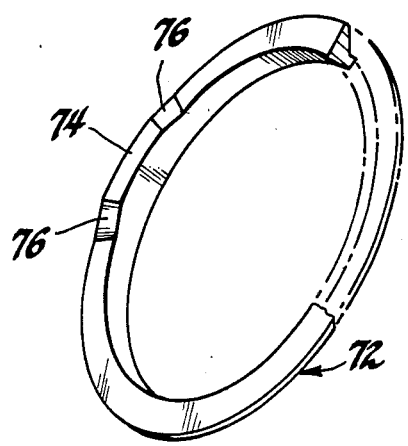
FIG. 5 is a perspective view of the cam ring employed in the torque strut in the previous figures to operate the limit switches.
Figure 4:
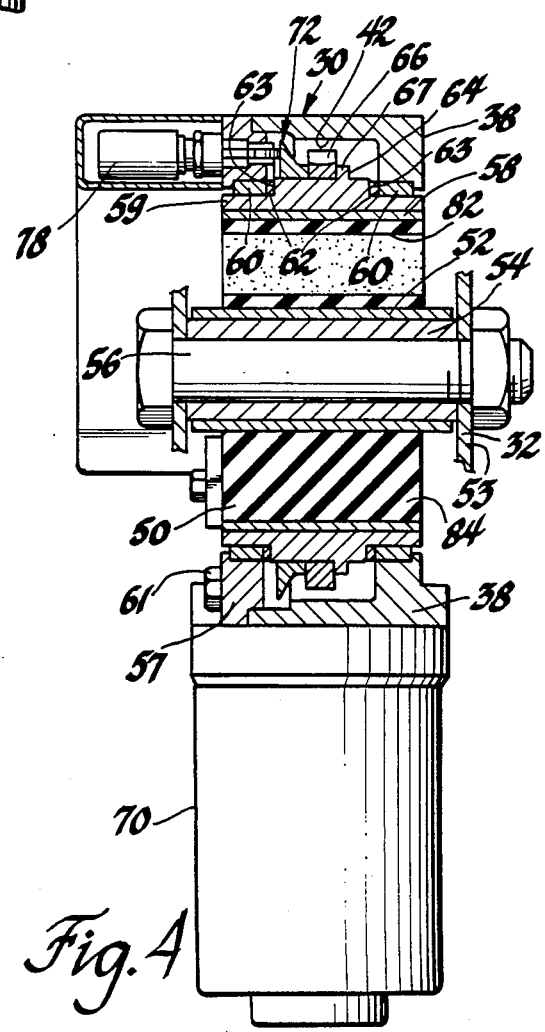
FIG. 4 is a view taken on the line 4—4 in FIG. 2.

As to the rotatable mounting of the elastomeric bushing 50 on the torque strut, this bushing is bonded to the interior of a cylindrical metal bushing 58 that is press-fitted in a cylindrical metal collar 59. The collar 59 is radially supported for rotation in the strut in a pair of axially spaced bearing rings 60 and is axially restrained by thrust rings 62 mounted between the inner sides of these bearing rings and radial shoulders 63 on a radially outwardly projecting annular portion 64 of the collar 59 as seen in FIG. 4. An annular-shaped retainer plate 57 received about the collar 59 and secured by bolts 61 to one side of the strut body 38 retains this rotatable assembly together and covers a ring gear 66 that is press-fitted on the raised center section 64 of the mounting collar 59 against a radial shoulder 67 formed thereon as seen in FIG. 4. The ring gear is engaged as seen in FIG. 3 by a worm gear 68 that is rotatably supported in the strut intermediate the two eyes for rotation about an axis perpendicular to the center line 69 through these eyes. The worm gear is connected to be driven by a DC motor 70 that is fixed to the lower side of the strut body with its axis at right angles to the axis of the rotary elastomeric bushing 50. A cam switch ring 72 is mounted concentric with and along the outer side of the ring gear 66 and is fixed to rotate therewith with and thus with the bushing 50. The cam switch ring 72 has a lobe 74 on one side thereof with a ramp 76 leading thereto in opposite angular directions. A pair of normally closed micro limit swithes 78 and 80 are mounted on the strut body and are arranged to be engaged by the cam lobe 74 to control the limits of angular movement of the bushing as described in more detail later.

The rotary elastomeric bushing 50 is configured so as to have a pair of diagonally oppositely located voids 82 and a remaining pair of diagonally oppositely located radially projecting solid sections 84 at right angles therewith. As a result and with the elastomeric bushing 50 angularly located in the position shown in FIG. 2 with the solid radial sections in longitudinal alignment with the center line of the strut, this bushing then provides a relatively high spring rate in the strut as compared with a relatively soft rate that is provided when the bushing 50 is rotated 90° therefrom to place the voids in longitudinal alignment with the strut. Furthermore, at any angular position intermediate these two positions, there is provided intermediate spring rate so that the bushing thus provides an infinite spring rate over this range of positions.

Figure 2:
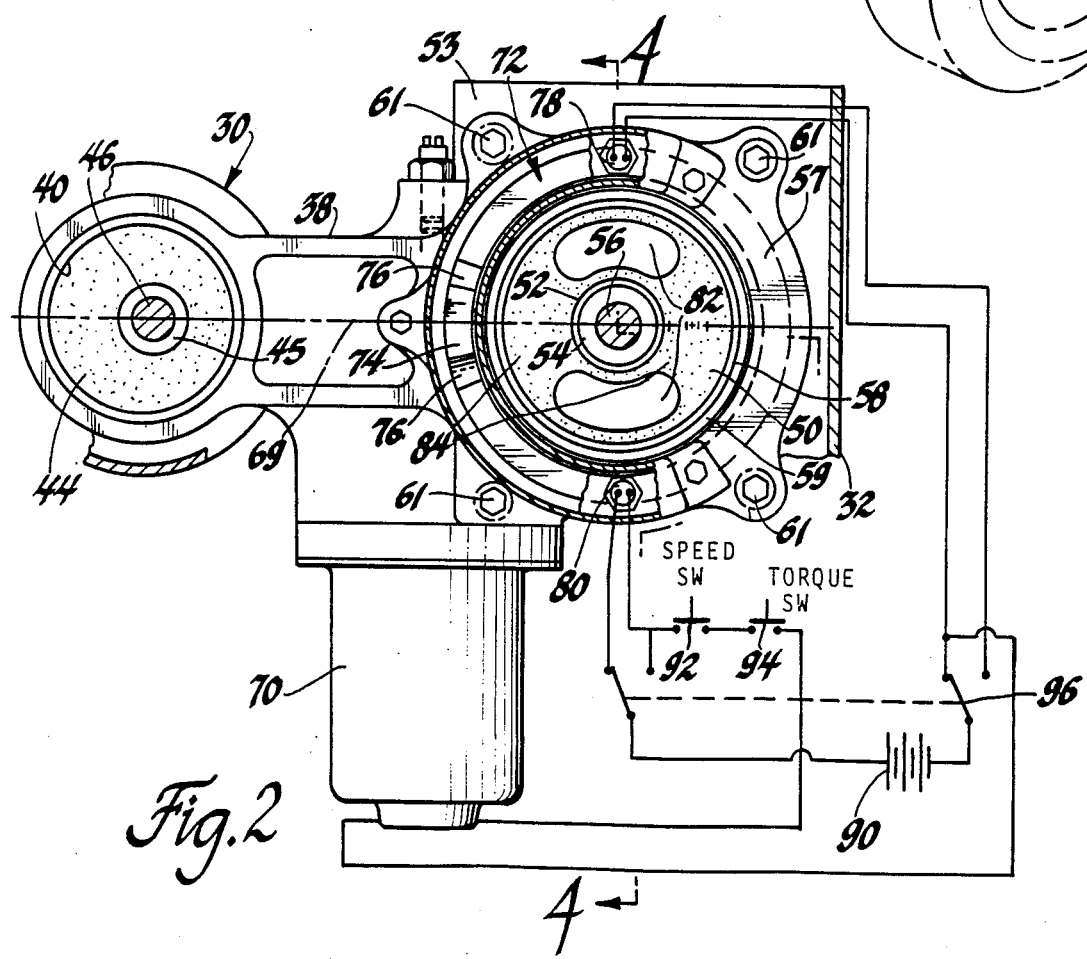
FIG. 2 is an enlarged side view with parts in section of the torque strut in FIG. 1 and additionally schematically showing an electric control circuit therefor.

Preferably, the mount is automatically controlled by a control circuit as shown in FIG. 2 wherein a DC power source 90 such as the motor vehicle battery is connected to operate the motor 70 so as to drive the bushing 50 in either direction in accordance with certain power train operating conditions. In the control circuit, there is an engine speed controlled switch 92 and an engine torque controlled switch 94 that are normally open and together with a double throw switch 96 are operated by a suitable conventional programmed control (not shown) sensing such power train operating conditions as engine speed and torque sensor. The switches 92 and 94 are connected in series to the motor and in relation to the two normally closed microswitches 78 and 80 and the double throw swith 96 such that the preprogrammed control operates the speed and torque switches to control the circuit so as to turn or angulate the bushing 50 in either direction to thereby adjust the active spring rate in the strut between the limits made available by the configuration of the rotary elastomeric bushing and in a manner to provide the optimum active spring rate in the strut at each such condition. For example, the control may be programmed so that at small vibratory pitching amplitudes of the power train occurring with low engine torque and speed, the control circuit would then operate to rotate the variable rate elastomeric bushing 50 so as to produce a relatively soft spring rate to best control such pitching. On the other hand, when large pitching power train amplitudes occur at high torque, the control circuit would then operate to rotate the variable spring rate bushing so as to provide an increased spring rate that would best counteract such large pitching amplitudes and again according to engine speed as well.

Furthermore, it will be understood that while the above arrangement is the preferred embodiment, the rotary variable spring rate bushing may be configured so as to be rotated in only one direction rather than by reversal to achieve the desired rate between prescribed limits. Furthermore, the variable spring rate bushing may be configured so as to provide further limits or combinations of spring rate. Moreover, two rather than one rotary elastomeric bushings may be used in the torque strut, i.e. one at each end of the torque strut, with both variable spring rate bushings then driven from the same drive or by individual drives.

Furthermore, it will be understood that the drive could be accomplished by some other power source such as by a vacuum motor or a hydraulic drive. In addition, the microswitches limiting rotation could take other forms such as magnetic or optical sensing devices. Furthermore, while the ring gear shown is formed completely around the variable spring rate bushing, it may be limited to a segment to thereby provide limited rotation between the extremes of the desired spring rates. And thus the preferred embodiment is intended to be illustrative of the invention which may be modified within the scope of the appended claims.

The embodiments of the invention in which an exclusive property or privilege is claimed are defined as follows:

1. In a vehicle having a transversely mounted power train elastomeric mount means supporting said power train on said vehicle, and torque strut means pivotally connected about pivot axes at opposite ends thereof to said power train and vehicle for controlling pitching of said power train, the improvement comprising said torque strut means having elastomeric means at one of said end connections having a configuration such as to effect a spring rate acting longitudinally of said strut means that varies with prescribed angular positioning of said elastomeric means relative to said strut means, and drive means for automatically varying the angular positioning of said elastomeric means to vary the spring rate and thereby control power train pitching in response to a sensed varying power train operating condition.

2. In a vehicle having a transversely mounted power train elastomeric mount means supporting said power train on said vehicle, and torque strut means pivotally connected about pivot axes at opposite ends thereof to said power train and vehicle for controlling pitching of said power train, the improvement comprising said torque strut means having an elastomeric bushing at one of said end connections supported for angular movement about one of said pivot axes, said bushing having a configuration such as to effect a spring rate acting longitudinally of said strut means that varies with angular positioning of said bushing about said one pivot axis, and drive means for automatically varying the angular positioning of said bushing to vary the spring rate and thereby control power train pitching in response to a sensed varying power train operating condition.

* * * * *